US006064126A

United States Patent [19]

Beardmore

[11] Patent Number: 6,064,126

[45] Date of Patent: May 16, 2000

[54] SWITCHES AND SWITCHING SYSTEMS

[76] Inventor: Geoffrey Beardmore, Shandon off Noverton Avenue, Prestbury, Cheltenham, Gloucestershire GL52 5DB, United Kingdom

[21] Appl. No.: 09/043,666

[22] PCT Filed: Nov. 11, 1996

[86] PCT No.: PCT/GB96/02774

§ 371 Date: Aug. 24, 1998

§ 102(e) Date: Aug. 24, 1998

[87] PCT Pub. No.: WO97/18574

PCT Pub. Date: May 22, 1997

[30] Foreign Application Priority Data

Nov. 14, 1995 [GB] United Kingdom .................. 9523238
Dec. 1, 1995 [GB] United Kingdom .................. 9524653

[51] Int. Cl.[7] ................................ H01H 1/04; H02B 1/24

[52] U.S. Cl. ........................................... 307/112; 307/125

[58] Field of Search .................................. 307/112, 116, 307/125, 130, 131, 139, 140; 361/748, 781, 807; 257/146, 499, 234

[56] References Cited

U.S. PATENT DOCUMENTS 5,479,042 12/1995 James et al. ............................ 257/415
5,619,061 4/1997 Goldsmith et al. ..................... 257/528
5,637,904 6/1997 Zettler .................................... 257/417
5,794,761 8/1998 Renaud et al. .......................... 200/181

*Primary Examiner*—Jeffrey Gaffin
*Assistant Examiner*—Peter Zura
*Attorney, Agent, or Firm*—Pollock, Vande Sande & Amernick

[57] ABSTRACT

An electrical switch has an evacuated housing with input and output terminals each connected to a respective group of metal tracks extending parallel and insulated from one another. A second silicon plate is cut to form several bridging elements, each having a metal layer on its upper and lower surface. Each bridging element extends transversely above tracks connected to different ones of the terminals. The housing is closed by a silicon cap having actuating tracks extending above the bridging elements, which form an electrostatic actuator with the metal layer on the upper surface of the bridging elements. When a voltage is applied to the electrostatic actuator, the bridging elements are driven down so that they contact tracks connected to different ones of the terminals and allow current to flow between them.

9 Claims, 2 Drawing Sheets

SWITCHES AND SWITCHING SYSTEMS

FIELD OF THE INVENTION

BACKGROUND OF THE INVENTION

This invention relates to switches of the kind including two terminals, a plurality of conductive tracks extending from each terminal, the conductive tracks connected with one terminal being electrically insulated from the tracks connected with the other terminal, the switch including a plurality of electrically-conductive bridging elements spaced from the tracks and displaceable between a first position where the bridging elements are spaced from the tracks and a second position where each bridging elements is in contact with a track connected with one terminal and a track connected with the other terminal such that current can flow in parallel between the two terminals via the conductive tracks and the bridging elements, and an actuator arranged to displace the bridging elements between the first and second position.

The switching of high currents is usually carried out by means of an electromagnetic relay or contactor employing a solenoid to displace an armature so that it bridges or isolates two contacts, thereby allowing or preventing current flow between the terminals. These relays can operate reliably but require relatively high currents to operate the solenoid. They are also bulky and heavy, and respond relatively slowly because of the mass of the armature. Lower currents can be switched using semiconductor devices such as FETs and thyristors but these have the disadvantage of introducing a voltage drop across the device and of not being suitable for higher current operation. U.S. Pat. No. 5,430,597 describes a current interrupting device of the above-specified kind having parallel branches extending from input and output lines, which are bridged by a number of micromechanical switches.

SUMMARY OF THE INVENTION

It is an object of the present invention to provide an improved form of switch.

According to one aspect of the present invention there is provided a switch of the above-specified kind. At least some of the bridging elements are formed in a common plate of material that is fixed and is formed to provide flexible elements by which the bridging elements are supported in the plate, such that each bridging element is independently flexible relative to the plate and failure of one bridging element in the second position does not prevent other bridging elements moving to the first position.

The upper surface of each track and the lower surface of each bridging element is preferably flat, the bridging elements in the lower position contacting the tracks across their entire width. The plate may be of silicon, the bridging elements having an electrically-conductive layer arranged to contact the tracks when the bridging elements are displaced to their second position. The bridging elements may be of rectangular shape, the flexible elements being a pair of flexure elements extending outwardly of each bridging element on opposite sides midway along its length. The actuator is preferable an electrostatic actuator. The conductive tracks and bridging elements are preferably located in an evacuated housing. The conductive tracks may extend on a silicon substrate. The conductive tracks may extend on a layer of diamond, the layer of diamond extending on a substrate of a different material.

According to another aspect of the present invention there is provided a switching system including a first switch according to the above aspect of the invention and a second semiconductor switch connected in series with the first switch.

BRIEF DESCRIPTION OF THE DRAWINGS

A switch and a system including a switch according to the present invention, will now be described, by way of example, with reference to the accompanying drawings, in which.

DETAILED DESCRIPTION OF THE INVENTION

Figure 1:
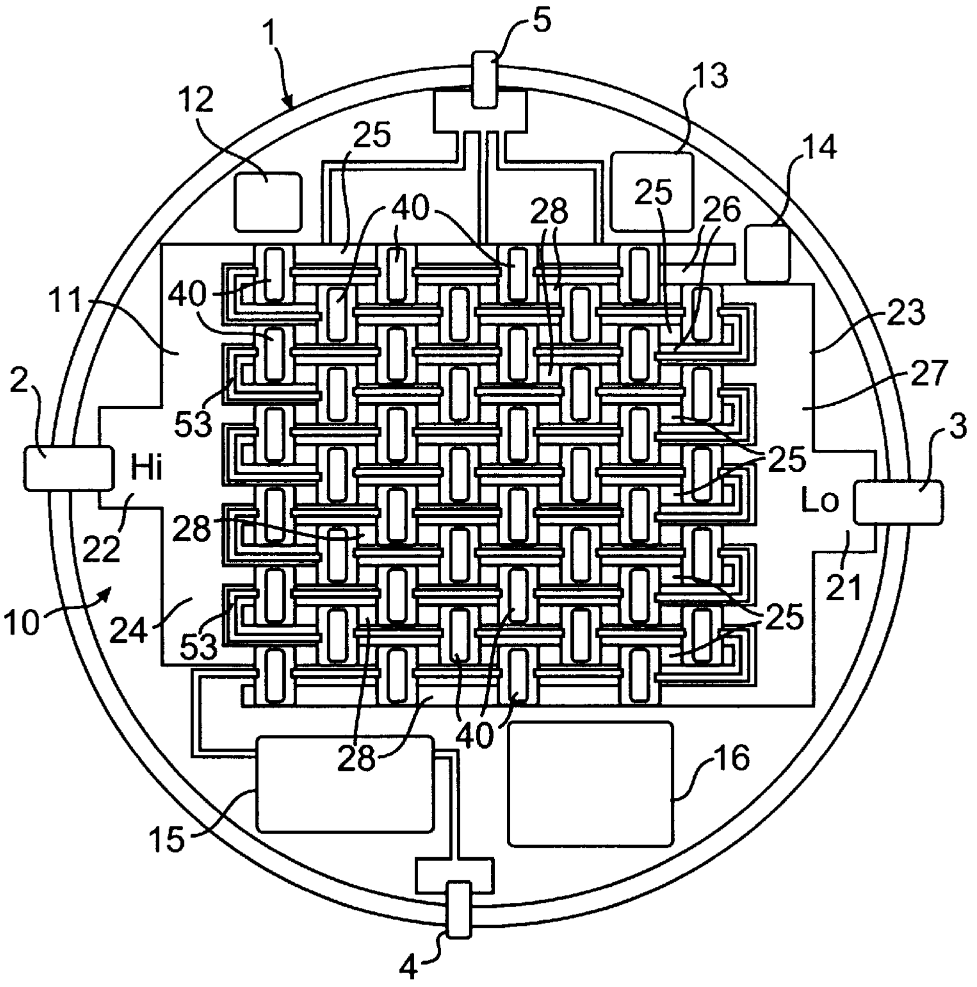
FIG. 1 is a plan view showing a lower wafer of the switch and the location of the bridging elements of the switch.

With reference first to FIG. 1, the switch has a sealed and evacuated outer housing 1 of circular shape through which project: two metal power terminals 2 and 3, an actuation terminal 4 by which the switch is controlled, and a fourth terminal 5 connected to various sensors within the switch by which its operation can be monitored.

Within the housing 1 there is a circular silicon substrate or wafer 10, on which is formed the switching assembly 11 and associated components such as arc suppression diodes 12, a thermal sensing and processing unit 13, a getter heater film and micro heater 14 to improve the vacuum within the switch, signal buffer circuitry and switching logic 15, and additional processing 16. The switching assembly 11 and associated components 12 to 16 may all be formed by conventional integrated circuit or microengineering techniques in the silicon wafer 10 or in layers deposited on the wafer. Alternatively, they could be separate, discrete components.

Figure 2:
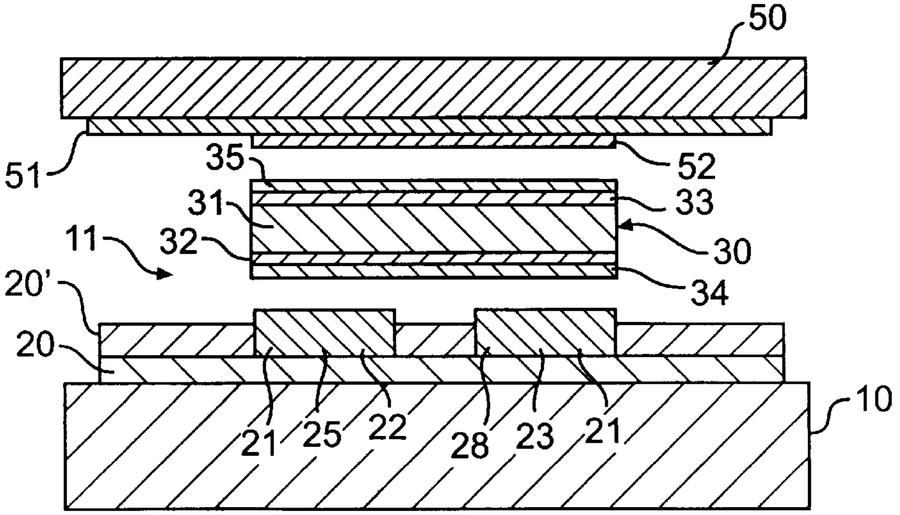
FIG. 2 is a cross-sectional transverse view of a part of the switch to an enlarged scale.
Figure 3:
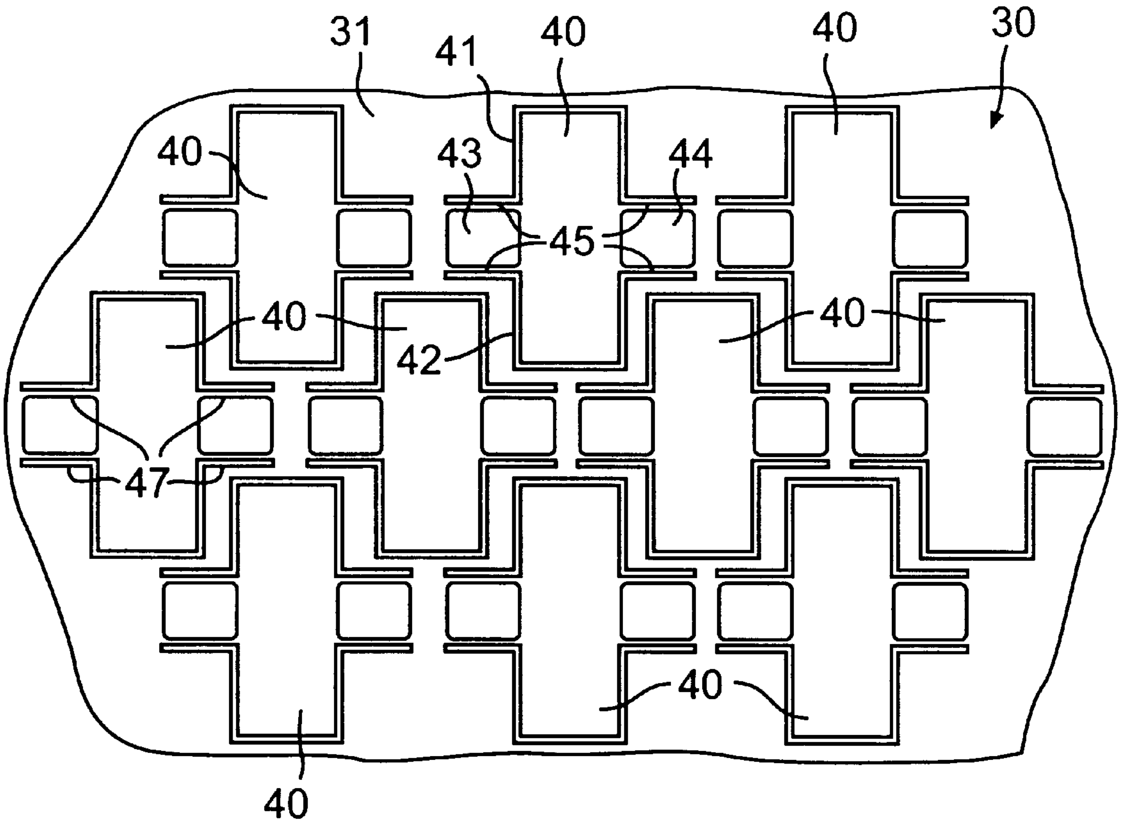
FIG. 3 is a plan view of a central wafer of the switch.

Referring now also to FIGS. 2 and 3, the switching assembly 11 is formed in a central region of the silicon wafer 10 and comprises a first electrically-insulative layer 20, such as of diamond, formed on the upper surface of the wafer. On top of the layer 20 there is deposited an electrically-conductive layer 21 of a metal such as silver. The conductive layer 21 is divided into two regions 22 and 23, which are normally electrically isolated from one another. One region 22, shown on the left of FIG. 1, is connected with the terminal 2 and has a lateral arm 24 and six straight, parallel bus bars 25 in the form of fingers extending longitudinally to the right of the wafer. The bus bars 25 are spaced from one another by five gaps 26. The other region 23 of the conductive layer 21 has the same shape as the left-hand region 22 with a lateral arm 27 connected with the other power terminal 3 and with six bus bars 28 extending to the left and interdigitated with the bus bars 25 of the left-hand region 22. The two sets of bus bars 25 and 28 extend parallel with one another and are spaced from one another by gaps so that they are electrically isolated from ore another. As shown in FIG. 2, the gap between the bus bars 25 and 28 is preferably filled to a level just below their upper surface with a second diamond layer 20'; both the layers 20 and 20' are electrically non-conductive but are thermally conductive.

A second, thin central silicon wafer 30 is mounted on the lower wafer 10 with its central region spaced above the lower wafer. The central wafer 30 is not shown in full in FIG. 1 or 2 but is shown most clearly in FIG. 3. The central wafer 30 comprises a silicon plate 31 having electrically-insulative layers 32 and 33 of a silicon oxide on its lower and upper surfaces. On top of the insulative layers 32 and 33 are deposited respective electrically-conductive layers 34 and 35 of a metal, such as silver. The central wafer 30 is machined through its thickness by micro-engineering techniques, such as etching or erosion, to give the pattern shown in FIG. 3 and form the wafer into forty-four bridging elements 40 of which only ten are shown in FIG. 3. Each bridging element 40 is of rectangular shape and is formed by two linear cuts 41 and 42 and two apertures 43 and 44. The linear cuts 41 and 42 form three sides of a square and two outwardly-projecting limb elements 45, to define the boundary of the bridging element 40. The apertures 43 and 44 are formed between the limb elements 45 of the two cuts 41 and 42, the size of the apertures and the spacing of the limb elements forming a pair of narrow flexure elements 47 on opposite sides extending parallel with one another at right angles to the bridging element 40 midway along its length. It can be seen that the cuts 41 and 42, and the apertures 43 and 44 separate the bridging element 40 from the remainder of the central wafer 30 except for the four flexure elements 47, which support the bridging elements in the wafer. These flexure elements 47 enable the bridging element 40 to be displaced vertically up or down relative to the plane of the central wafer 30 when acted on by an external force. The positioning of the bridging elements 40 is shown in FIG. 1 and it can be seen from this that the elements are oriented transversely to the bus bars 25 and 28 and extend between a bus bar 25 of one region 22 and a bus bar 28 of the other region 23, bridging the gap between them. The bridging elements 40 are arranged in eleven groups of four elements, each group of elements being located above the same two bus bars and being equally spaced along their length.

A third, upper silicon wafer 50 is mounted above the lower wafer 10 and the central wafer 30. The upper wafer 50 is preferably in the form of a cap sealed about its outer edge to the lower wafer 10 so as to enclose the various component 3. On the underside of the upper wafer 50, there is an electrically-insulative layer 51 and a eight metal actuating tracks 52 extending transversely of the bus bars 25 and 28 and aligned with the bridging elements 40. The tracks 52 are electrically connected with a track 53 on the lower wafer, which is in turn connected to the control terminal 4 via the buffer circuit 15. The upper conductive layer 35 on the central wafer 30 is also connected to the buffer circuit 15. The tracks 52 on the wafer 50 and the conductive layer 35 on the bridging elements 40 together form an electrostatic actuator for displacing the bridging elements.

In the natural state of the switch, the bridging elements 40 are in a first position equally spaced between the bus bars 25 and 28 and the actuating tracks 52, so that they do not contact either the lower wafer 10 or the upper wafer 50. In this natural state of the switch, no current can flow between the two power terminals 2 and 3, so the switch is off or open.

In order to close the switch, a signal is applied to the actuation terminal 4. This causes the circuit 15 to apply a voltage of the same polarity to both the actuating tracks 52 and to the actuating electrodes formed by the conductive layer 35 on the upper surface of the bridging elements 40. This produces a repulsive electrostatic force between the tracks 52 and the bridging elements 40, thereby driving the bridging elements down into their second position, in contact with the bus bars 25 and 28 on the lower wafer 10. This, therefore, causes the bridging elements 40 to bridge the bus bars 25 and 28 connected to the different terminals 2 and 3, allowing current to flow between the terminals. To open the switch, a different signal is applied to the actuation terminal 4, causing the circuit 15 to apply voltages of opposite polarities to the actuating tracks 52 and the actuating electrodes 35 so that the bridging elements 40 are pulled upwardly above their natural position. The voltages are then removed so that the bridging elements 40 can return to their natural central position. The flexure mounting 47 of the bridging elements 40 allows the elements to tilt so that they can accommodate geometric irregularities of the bus bars.

The use of multiple bridging elements, each connected in parallel with one another, means that each element need only be capable of conducting a corresponding fraction of the total current passed by the switch. Ideally, each bridging element would pass the same current, however, in practice, manufacturing variations and other factors may lead to some elements passing a greater current than others. Providing, however, that the conductors in the switch have a positive temperature coefficient, this increased current leads to an increase in temperature of the conductors in series with the bridging element and hence an increase in the resistance and a corresponding reduction in current. The low thermal mass of the different elements of the switch means that this self-regulating effect will be very rapid. The bridging elements 40 can have a very small size and low inertia giving the switch a very high switching speed. The switch is a true mechanical switch so it has a low contact resistance and a high open resistance compared with a semiconductor switch. Where very high currents need to be passed, several switches can be stacked together so that they operate in parallel. The switch can be made in volume at low cost and can have a high resistance to vibration and shock. Also, the switch can operate silently and it produces only low levels of electromagnetic interference. The design is fault tolerant since the failure of one bridging element to make contact would not significantly affect operation. If one element should fail to break contact, it would simply fuse and this section of the switch would go open circuit. The fusing current of one bridging element is selected to be less than the fusing current of a bus bar. By operating the bridging elements in a high vacuum free of organic matter, there is a maximum insulation, arc suppression and life. The vacuum also eliminates windage effects and squeeze film damping so that switching times are minimized.

The layout of the bus bars 25 and 28 over the surface of the wafer 10 distributes the current carrying and current switching across the surface of the wafer so as to spread the thermal load. The thermal sensor 13 is used to monitor the temperature within the switch and to cause the switch to open if temperature should rise above a safe level.

Figure 4:
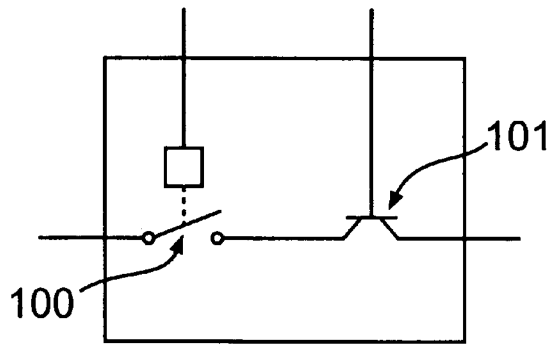
FIG. 4 is a schematic diagram of a system including the switch.

The actuator need not be of an electrostatic kind, alternatively, it could be piezoelectric thermal or the like. The natural state of the switch could be closed, the actuator being energized to open the switch The mechanical switch of the present invention could be connected in series with a conventional semiconductor power switch, as shown in FIG. 4, to form a switching system. In this arrangement a mechanical switch of the kind described above is indicated by the numeral 100 and this is connected in series with a power switching transistor. or the like. 101. The transistor 101 would be opened first so that the voltage is held off the mechanical switch 100 while this breaks and maintains a gap. The advantage of this is that it would reduce the risk of break-down in the vacuum within the mechanical switch 100, between the bridging elements 40 and the bus bars 25 and 28 as the gap opens. Once open, the mechanical switch 100 would prevent leakage current through the semiconductor switch 101. This system would also have the advantage of redundancy. The mechanical switch 100 would act as a fall back and a fuse if the transistor 101 should fail in a conducting state. The transistor 101 would act as a circuit breaker if the mechanical switch 100 should become stuck in a conducting state. The mechanical switch 100 and the semiconducting switch 101 could be formed on the same wafer.

What is claimed is:

1. An electrical switch for enabling or preventing current flow between two points wherein the switch includes two terminals, a plurality of conductive tracks extending from each terminal, the conductive tracks connected with one terminal being electrically insulated from the tracks connected with the other terminal, the switch including a plurality of electrically-conductive bridging elements spaced from the tracks and displaceable between a first position where the bridging elements are spaced from the tracks and a second position where each bridging element is connected with one terminal and a track connected with the other terminal such that current can flow in parallel between the two terminals via the conductive tracks and the bridging elements, and an actuator arranged to displace all the bridging elements together between the first and second position, such that all the bridging elements are either in the first or second position at any one time, wherein at least some of the bridging elements are formed in a common plate of material that is fixed and is formed to provide flexible elements by which the bridging elements are supported in the plate, such that each bridging element is independently flexible relative to the plate and failure of one bridging element in the second position does not prevent other bridging elements moving to the first position.

2. A switch according to claim 1, wherein the upper surface of each track and the lower surface of each bridging element is flat, and that, in the second position, the bridging elements contacts the tracks across the entire width of the tracks.

3. A switch according to claim 1, wherein the plate is of silicon and the bridging elements have an electrically-conductive layer arranged to contact the tracks when the bridging elements are displaced to their second position.

4. A switch according to claim 1, wherein the bridging elements are of rectangular shape, and that the flexible elements are a pair of flexure elements extending outwardly of each bridging element on opposite sides midway along the length of the bridging element.

5. A switch according to claim 1, wherein the actuator is an electrostatic actuator.

6. A switch according to claim 1, wherein the conductive tracks and the bridging elements are located in an evacuated housing.

7. A switch according to claim 1, wherein the conductive tracks extend on a silicon substrate.

8. A switch according to claim 1, wherein the conductive tracks extend on a layer of diamond, and that the layer of diamond extends on a substrate of a different material.

9. A switch according to claim 1 including a second semiconductor switch connected in series with the switch.

* * * * *

UNITED STATES PATENT AND TRADEMARK OFFICE
CERTIFICATE OF CORRECTION

PATENT NO. : 6,064,126
DATED : 05/16/00
INVENTOR(S) : Geoffrey Beardmore

It is certified that error appears in the above-identified patent and that said Letters Patent is hereby corrected as shown below:

The name of the Assignee has been omitted. Section [73] should be added as follows:

[73] Assignee: Smiths Industries Public Limited Company, London, United Kingdom Signed and Sealed this First Day of May, 2001

*Attest:*

Nicholas P. Godici

NICHOLAS P. GODICI

*Attesting Officer* *Acting Director of the United States Patent and Trademark Office*

UNITED STATES PATENT AND TRADEMARK OFFICE

CERTIFICATE OF CORRECTION

PATENT NO. : 6,064,126
DATED : May 16, 2000
INVENTOR(S) : Geoffrey Beardmore

It is certified that error appears in the above-identified patent and that said Letters Patent is hereby corrected as shown below:

Section [73] should be added as follows:

[73] Assignee: Smiths Industries Public Limited Company, London, United Kingdom Signed and Sealed this Eighteenth Day of September, 2001

*Attest:*

NICHOLAS P. GODICI

*Attesting Officer*

*Acting Director of the United States Patent and Trademark Office*